United States Patent
Rosen

(10) Patent No.: US 7,077,886 B2
(45) Date of Patent: Jul. 18, 2006

(54) EMISSION CONTROL DEVICE AND METHOD OF OPERATION THEREOF

(75) Inventor: Eric B. Rosen, London (CA)

(73) Assignee: KMW Group, London (CA)

( * ) Notice: Subject to any disclaimer, the term of this patent is extended or adjusted under 35 U.S.C. 154(b) by 9 days.

(21) Appl. No.: 10/742,849

(22) Filed: Dec. 23, 2003

(65) Prior Publication Data

US 2004/0134351 A1   Jul. 15, 2004

Related U.S. Application Data

(60) Provisional application No. 60/435,368, filed on Dec. 23, 2002.

(51) Int. Cl.
   *B01D 47/00*   (2006.01)
(52) U.S. Cl. .............. 95/218; 95/222; 96/359
(58) Field of Classification Search .......... 96/359; 95/218, 221, 222, 223, 270; 261/84, 79.2, 261/115; 55/408
   See application file for complete search history.

(56) References Cited

U.S. PATENT DOCUMENTS

| | | | | |
|---|---|---|---|---|
| 1,898,807 A | * | 2/1933 | Barnes | 95/218 |
| 1,976,629 A | * | 10/1934 | Parkinson | 423/210 |
| 2,575,359 A | * | 11/1951 | Ortgies | 96/237 |
| 3,073,095 A | * | 1/1963 | Hungate | 96/281 |
| 3,102,800 A | * | 9/1963 | Bora | 96/359 |
| 3,149,935 A | * | 9/1964 | Jamison et al. | 95/218 |
| 3,336,733 A | * | 8/1967 | Wisting | 96/235 |
| 3,557,535 A | * | 1/1971 | Howick | 96/316 |
| 3,645,070 A | * | 2/1972 | Roe | 96/281 |
| 3,710,554 A | * | 1/1973 | Brookman | 96/305 |
| 3,853,515 A | * | 12/1974 | Davis | 96/358 |
| 4,102,658 A | * | 7/1978 | Jarvenpaa | 96/284 |
| 4,356,009 A | * | 10/1982 | Calvert | 95/222 |
| 4,361,490 A | * | 11/1982 | Saget | 210/787 |
| 4,375,975 A | * | 3/1983 | McNicholas | 95/270 |
| 4,594,081 A | * | 6/1986 | Kroll et al. | 96/235 |
| 5,076,819 A | * | 12/1991 | Sharrow | 95/151 |
| 6,488,745 B1 | * | 12/2002 | Gu | 95/272 |

* cited by examiner

*Primary Examiner*—Frank M. Lawrence
(74) *Attorney, Agent, or Firm*—Daryl W. Schnurr

(57) ABSTRACT

An emission control device and a method of operation thereof removes particulates from air. The air is directed into the device after finely divided mist has been added to the air. The air is abruptly forced to change directions within the device and the added moisture is removed along with the particulates. A fan with inner vanes and outer blades is located within the device to direct the flow of air and to remove the moisture and particulates.

23 Claims, 4 Drawing Sheets

EMISSION CONTROL DEVICE AND METHOD OF OPERATION THEREOF

Priority is claimed based upon U.S. Provisional Application Ser. No. 60/435,368 filed on Dec. 23, 2002.

BACKGROUND OF THE INVENTION

1. Field of Invention

This invention relates to an emission control device to remove particulates from a gas and, more particularly to an emission control device that operates by adding moisture to the gas and subsequently removing moisture from the gas along with particulates. Still more particularly, this invention relates to a scrubber with a fan located therein.

2. Description of the Prior Art

Emission control devices are known. However, previous devices do not operate effectively to remove particulates from a gas, or, they are extremely expensive to operate or to construct, or, they are inefficient.

Settling tanks have been used previously to separate particulates from a gas. Further, it is known to have a wet scrubber that uses water to separate particulates from a gas, but previous scrubbers do not contain a fan.

SUMMARY OF THE INVENTION

It is an object of the present invention to provide an emission control device for removing particulates from a gas the device having an inlet and an outlet, the device containing a rotor and fan to separate moisture from the gas and to direct the gas to an outlet respectively.

An emission control device has an inlet and an outlet for gas containing particulates. The device has a housing with a passage extending between the inlet and outlet. A moisturizer is located at or near the inlet to moisturize the gas. A blower is located to cause the gas to flow through the device. A rotor is located in the housing across the passage the rotor having blades extending radially outward therefrom. The rotor is mounted to remove moisture and particulates from the gas. The blower and rotor are constructed on the same component at least partially within a common radial plane with two sets of blades, a first set of blades for the blower and the blades of the rotor being a second set of blades of said two sets of blades.

Preferably, the emission control device is a scrubber.

A method of operating an emission control device to remove particulates from a gas has an inlet and an outlet outlet with a passage therein to receive the gas and to direct the gas to the outlet. There is a moisturizer at or near the the inlet. The device has a blower that is located to cause the gas to flow through the device. A rotor is located in the housing across the passage, the rotor being rotatably mounted to remove moisture and particulates from the gas. The passage has a change of direction and the device has a drain for moisture, the method comprises adding moisture to the gas at the inlet, operating the blower to move gas through the device while rotating the rotor, at least partially within a common radial plane with the blower to remove particulates and moisture from the gas and directing the gas to the outlet, while draining moisture from the device through the drain.

DESCRIPTION OF A PREFERRED EMBODIMENT

Figure 1:
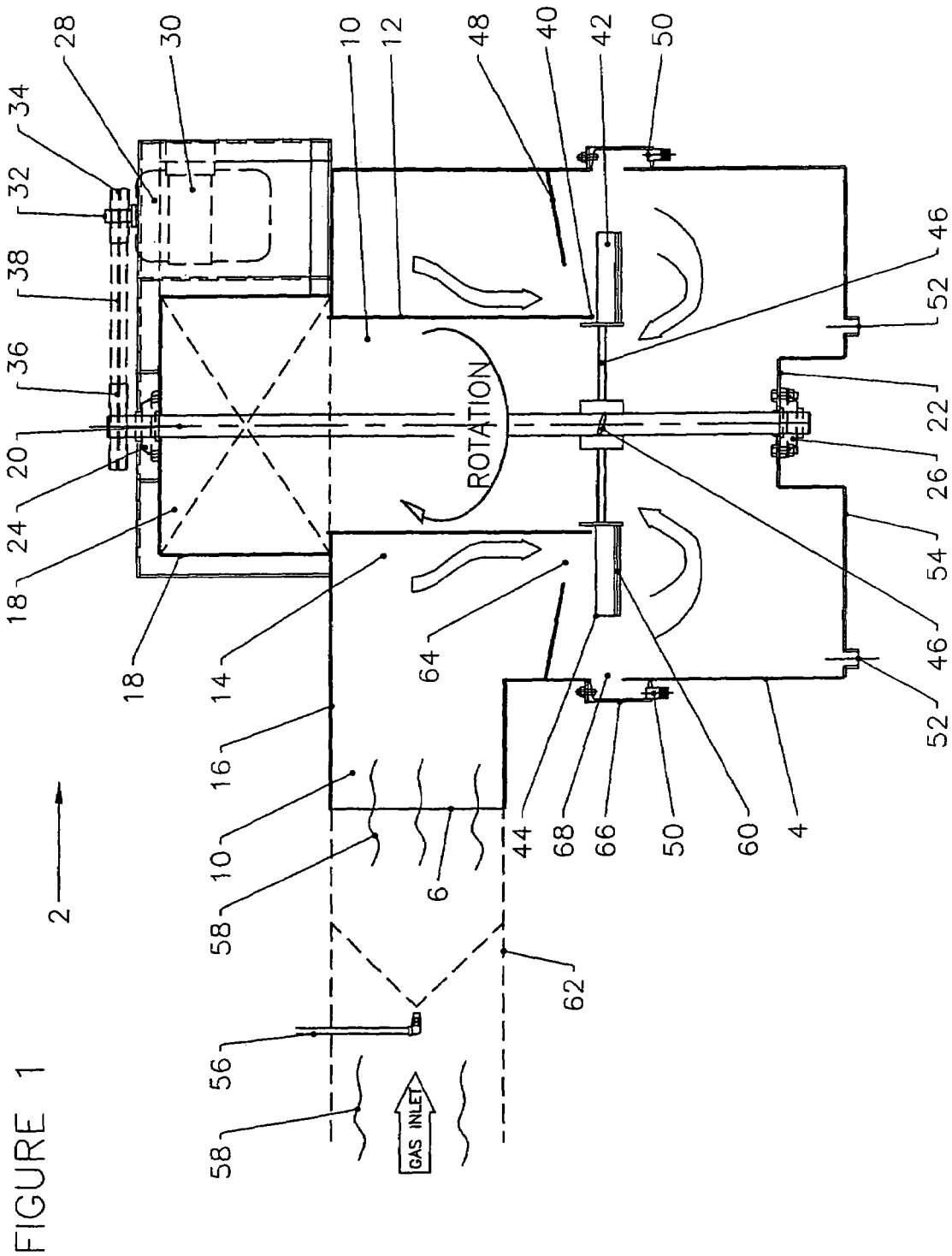
FIG. 1 is a schematic side view of a scrubber.
Figure 2:
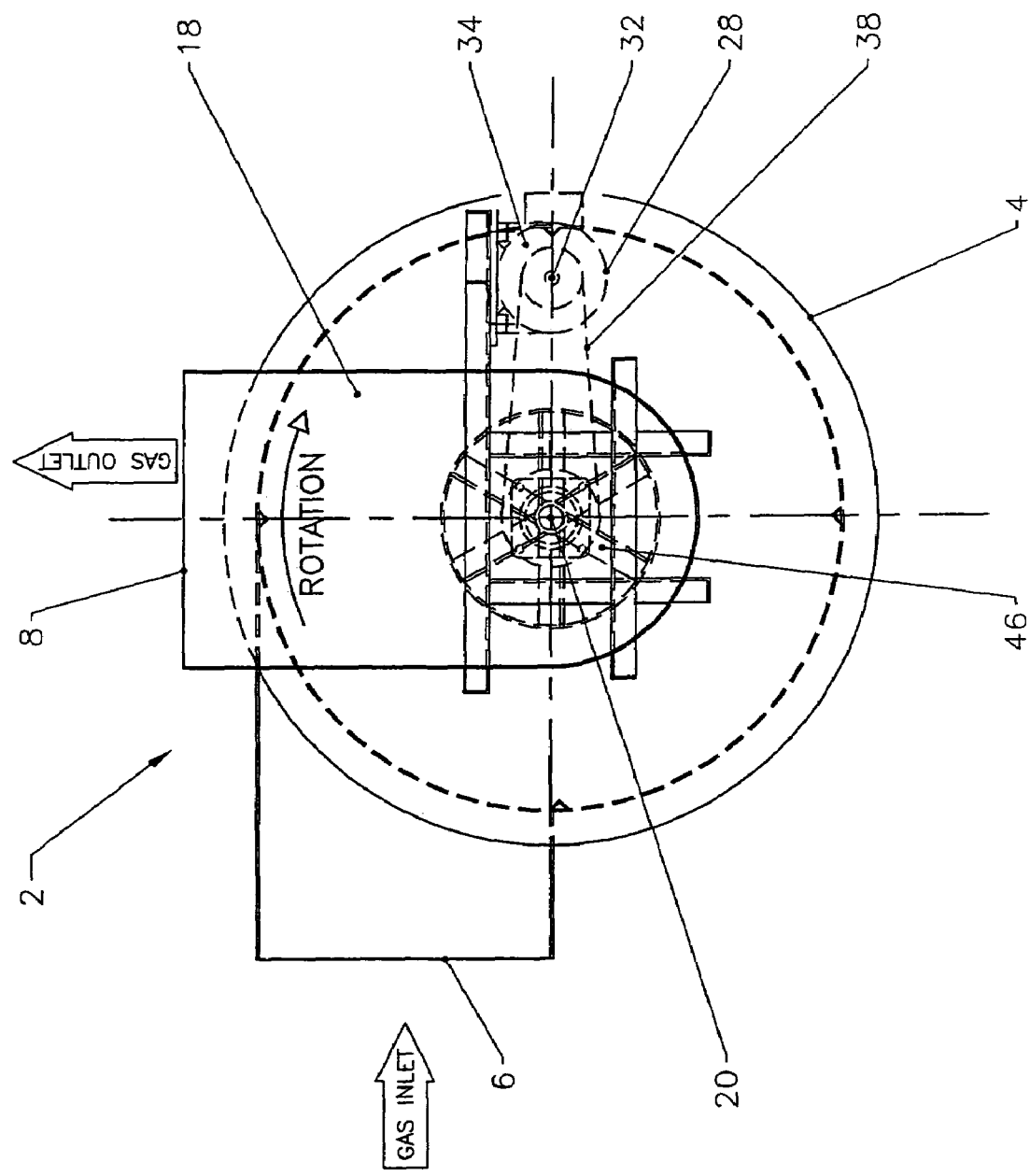
FIG. 2 is a top view of the scrubber of FIG. 1.

In FIGS. 1 to 4, an emission control device 2 has a housing 4 with an inlet 6 and an outlet 8. Within the housing 4 there is a passage 10, which extends in more than one direction to the outlet 8. A cylindrical section 12 of the passage 10 is concentrically mounted in an upper portion 14 of the housing 4. On a top 16 of the housing 4, there is mounted a hood 18. A shaft 20 extends vertically through the housing 4 from the hood 18 to a bottom 22. The shaft 20 is rotatably mounted in bearings 24, 26. A motor 28 is mounted in a bracket 30. The motor has a shaft 32 that has a pulley 34 thereon. The shaft 20 that extends through the housing has a pulley 36 mounted thereon. Preferably, the motor 28 is an electrical motor (the electrical connections are not shown) and a belt 38 connects the pulleys 34, 36so that the motor 28 can rotate the shaft 20. Beneath a lower edge 40 of the cylindrical section 12, there is a blower 42 mounted on the shaft 20. The blower 42 is a fan. The fan 42 has outer blades 44 and inner vanes 46. The outer blades 44 form a rotor which is shown as being one component with the fan. The fan and the rotor are located substantially within the same plane. The rotor and the fan could be separate components. The fan could be located outside of the device or elsewhere within the device. The purpose of the fan is to cause the gas to move through the device. The purpose of the rotor is to remove moisture and particulates from the gas. The inlet 6 is located near a top 16 of the housing 4. The housing contains an annular baffle 48 that is located between the inlet 6 and the fan 42. There is a lateral drain 50 located around a circumference of the housing 4 radially outward from the fan 42. Additional drains 52 are located in a base 54 of the housing 4.

A plurality of moisturizers 56 (only one of which is shown) is located outside the inlet 6. The moisturizers 56 add a fine mist to a gas 58 just before the gas enters the inlet 6. When the fan 42 is activated, gas containing particulates is drawn into the inlet 6 and is directed by the shape of the passage 10 and the annular baffle 48 downward and inward. Immediately after passing the baffle 48, the gas strikes the outer blades 44 of the fan 42. The outer blades 44 are generally flat and lie in a vertical plane and the blades direct the gas outward and downward. Since the gas contains moisture, the blades 44 remove some of the moisture from the gas 58 and force it by centrifugal force to the drain 50. The particulates affix themselves to water droplets in the mist. Therefore, as the moisture is removed, some of the particulate matter is also removed through the lateral drain 50. After passing downward through the fan 42, the gas is forced inward and upward by the inner vanes 46 of the fan 42 into an interior of the cylindrical section 12. The vanes 46 are angled to force the gas upward as the fan rotates. The abrupt change in direction causes the gas to lose more moisture and the gas moves upward through the hood 18 to the outlet 8. The gas can then be further cleaned or it can be released to the atmosphere or recycled. The extra moisture is drained away through the drains 52 in the base 54.

Figure 3:
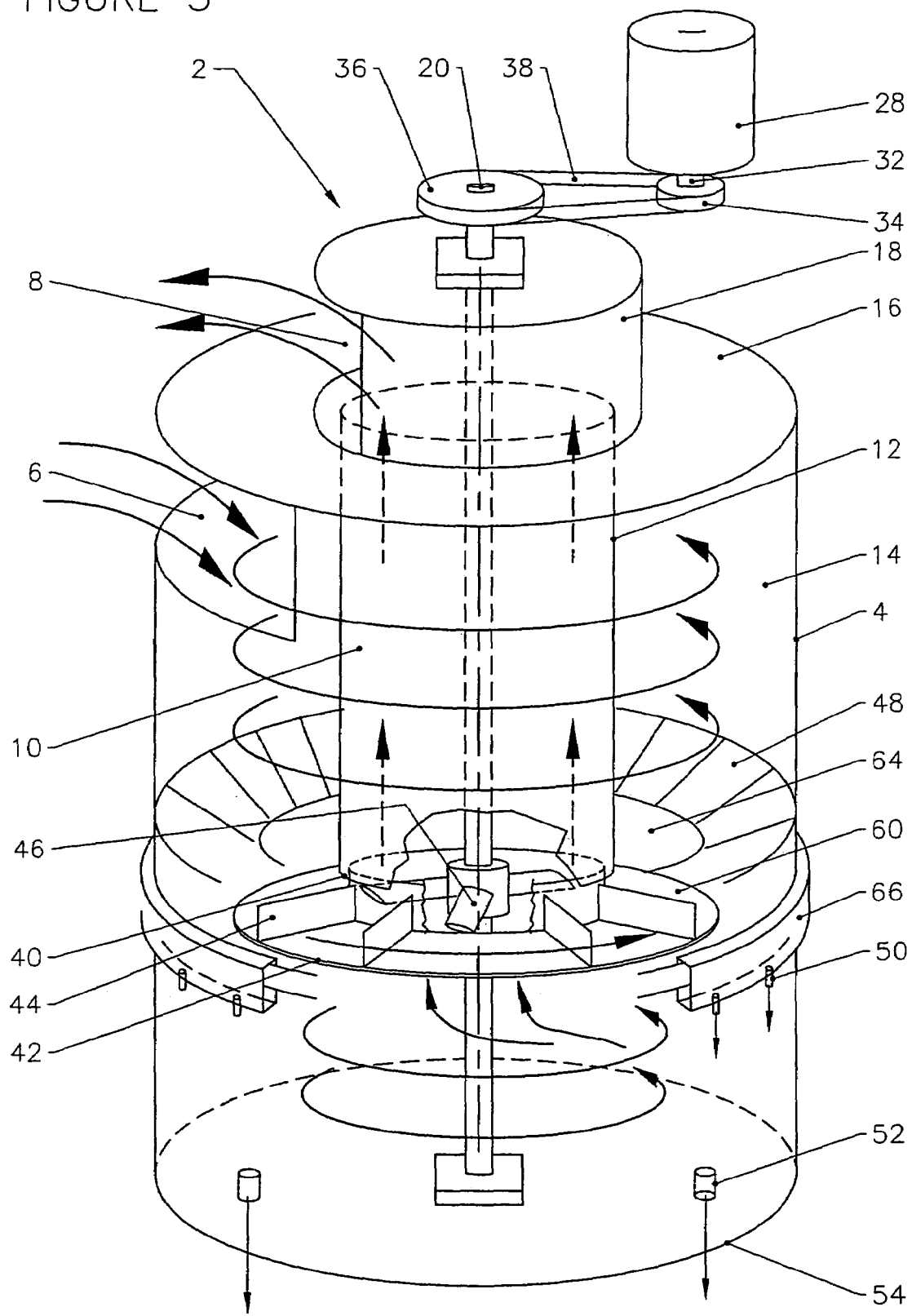
FIG. 3 is a schematic perspective view of a scrubber with a part of the housing partially cutaway.
Figure 4:
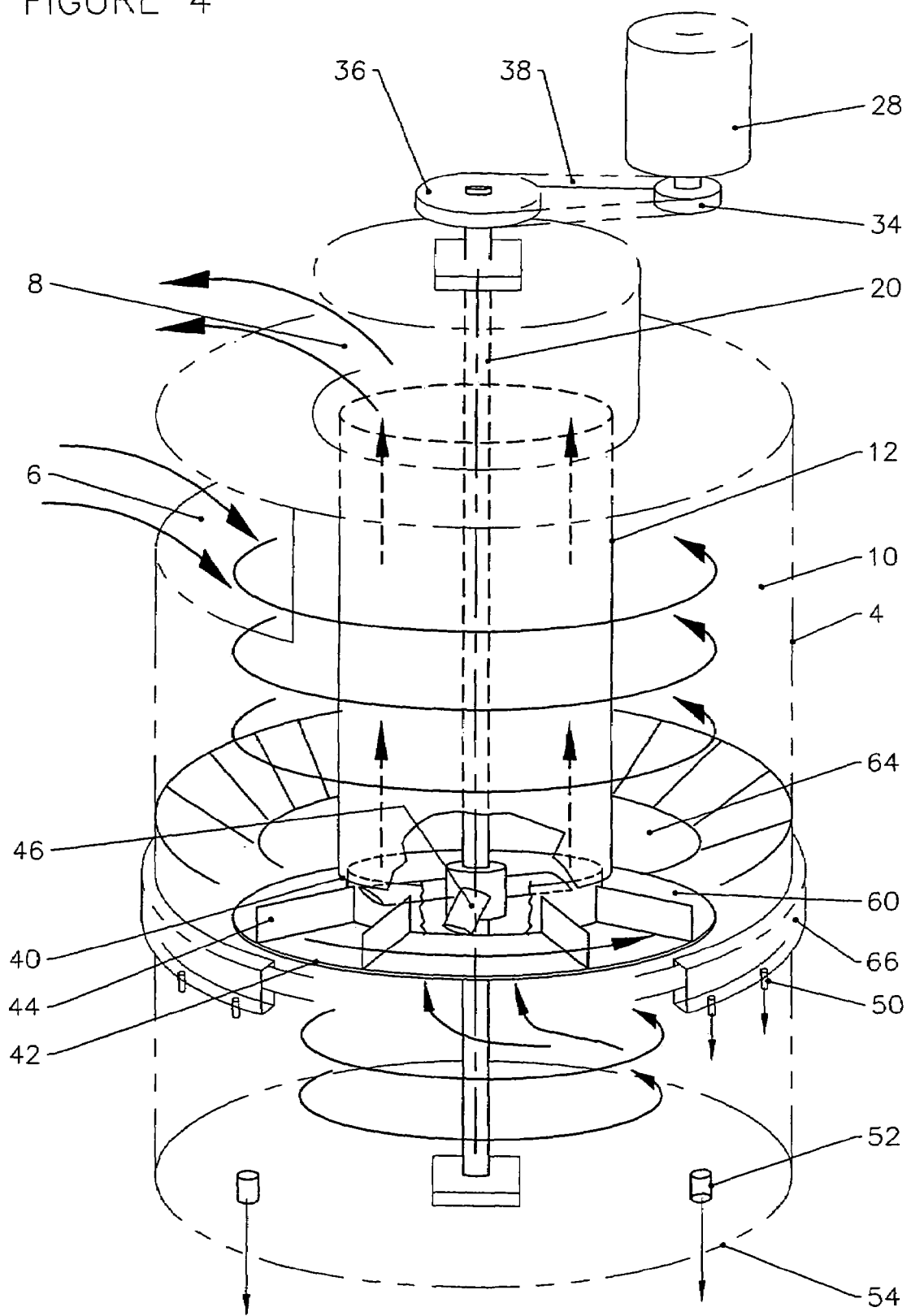
FIG. 4 is a schematic perspective view of the scrubber with the housing drawn with light lines.

Preferably, the emission control device is a scrubber, the gas is air and the moisturizers are nozzles that are capable of creating a finely divided mist. The moisture is preferably water. Preferably, the fan has a disc 60 that extends beneath the outer blades 44. For ease of illustration, not all of the blades and vanes are shown in FIGS. 3 and 4. Preferably, the blades and vanes are equally spaced around the circumference of the fan. Preferably, there is one blade for each vane. The inner vanes connect the outer blades and the disc to the shaft 20. The fan is mounted across the passage 10 at a location where the air changes direction by 180° and the cross sectional area of the passage is substantially reduced. Further, the air direction changes from a downward direction to an upward direction. The amount of water injected into the gas stream is such that a wet environment is created with sufficient free water carried by the gas. Prior to entering the inlet 6, the gas is transported in a duct 62 shown by dotted lines in FIG. 1.

The direction of flow of the gas is indicated by arrows in FIGS. 1, 3 and 4. As soon as the gas enters the housing 4 through the inlet 6, it is directed inward and downward in a down-spiraled action. Partway down the housing, the gas is directed inwardly by the baffle 48 through a narrow annular opening 64 around the outside of the cylindrical section 12. This forces the gas to rapidly increase in velocity and the moisture in the gas stream together with the free water will adhere to additional dust particles in the gas. After the gas has passed by the baffle 48, the outer blades 44 of the fan 42 cause the gas to turn sharply outward while continuing to rotate the gas around an interior of the housing 4. Since the water in the gas is heavier than the gas itself, the centrifugal effect caused by the outer blades 44 of the fan 42 effectively separates much of the water from the gas. The water, which has trapped the dust particles in the gas stream, swirls around within the housing and is forced against the inside wall of the housing 4. The lateral drain 50 is a circumferential drain that extends around the housing 4 in a band 66 having an opening 68 located radially outward from the fan 42. Since the water has trapped the dust particles in the gas stream, most of the dust particles and the water is forced out of the housing through the lateral drain 50.

After passing by the blades 44 of the fan 42, the gas contains virtually no free water, but only saturated moisture and little or no free water droplets. Additional water separation is achieved by the rapid change of direction in the gas stream as it makes a 180° turn upwards into the cylindrical section 12. Moisture that separates from the gas and does not exit the housing through the lateral drain 50 falls to the base 54 and exits the housing through the additional drains 52. The inner vanes 46 on the fan 42 force the gas upward through the cylindrical section 12. The positive force exerted on the gas stream by the vanes 46 virtually eliminates any pressure drop in the gas as it passes through the emission control device 2. When the gas reaches the hood 18 and the outlet 8, it is preferably directed into a connecting duct (not shown) for further transport. All water is recovered in the scrubber, with the exception of the moisture absorbed by the saturated gas, and is collected in a container. From this container, the water is then piped for re-use to a pump, which increases the water pressure. The water is then piped back to the spray nozzles. The circulation and reuse of the water reduces the water consumption significantly.

By circulating and reusing the water, the concentration of suspended particles will increase. The device of the present invention can be operated continuously or, intermittently, as required. The water is independently pumped from the container by a second pump to a filter and then returned again.

The device of the present invention is efficient and cost effective to collect airborne dust particles from many sources of emissions. One source of these emissions is industrial boilers, including those that are burning waste wood and emit airborne ash particles (flyash) in the flue gas from their gas stacks.

I claim:

1. An emission control device comprising an inlet and an outlet for gas containing particulates, said device having a housing with a passage extending between said inlet and said outlet, a moisturizer located at or near said inlet to moisturize said gas, a blower located to cause said gas to flow through said device, a rotor located in said housing across said passage, said rotor having blades extending radially outward therefrom, said rotor being rotatably mounted to remove moisture and particulates from said gas, said blower and said rotor hems constructed on the same component at least partially within a common radial plane with two sets of blades, a first set of blades for the blower and said blades of said rotor being a second set of blades of said two sets of blades, said passage having a change in direction to assist in removing moisture and particulates from said gas, said device having a drain for moisture.

2. A device as claimed in claim 1 wherein said device is a scrubber and said blower is a fan.

3. A device as claimed in claim 1 wherein said blower and said rotor are located substantially within the same plane.

4. A device as claimed in claim 1 wherein the first set of blades is oriented at an angle to force said gas through said device and said second set of blades is oriented at an angle that is substantially perpendicular to a direction of rotation of said component.

5. A device as claimed in claim 1 wherein said blades of said rotor are oriented at an angle that is substantially perpendicular to a direction of rotation of said rotor.

6. A device as claimed in any one of claim 1, 2 or 3 wherein said housing has a cylindrical shape.

7. A device as claimed in any one of claim 1, 2 or 3 wherein said housing has a cylindrical shape and said passage is located on an outer portion of said housing between said inlet and said change of direction, said passage being located on a central portion of said housing between said change of direction and said outlet.

8. A device as claimed in claim 1 wherein said passage extends downward from said inlet and said passage extends upward at said change of direction.

9. A device as claimed in claim 2 wherein said rotor is located at said change of direction.

10. A device as claimed in claim 1 wherein said component is located at said change of direction.

11. A device as claimed in claim 1 wherein said rotor is centrally mounted across said passage.

12. A device as claimed in claim 1 wherein said component is centrally mounted across said passage and said passage has a cylindrical shape.

13. A device as claimed in any one of claim 1, 2 or 3 wherein said moisturizer is at least one spray nozzle.

14. A device as claimed in any one of claim 1, 2 or 3 wherein said moisturizer is a plurality of spray nozzles.

15. A device as claimed in claim 1 wherein said moisturizer is located upstream of said inlet.

16. A device as claimed in claim 1 wherein said housing has a cylindrical shape and a section of said passage between said change of direction and said outlet is formed by a cylindrical wall that is concentrically mounted within said housing.

17. A method of operating an emission control device to remove particulates from a gas, said device having an inlet and an outlet with a passage therein to receive said gas arid to direct said gas to said outlet, there being a moisturizer located at or near said inlet, said device having a blower located to cause said gas to move through said device, said device having a rotor that is rotatably mounted across said passage, said rotor having blades extending radially outward therefrom across said passage, said passage having a change of direction and said device having a drain for moisture, said method comprising adding moisture to said gas at said inlet, operating said blower to move said gas through said device while rotating said rotor at least partially within a common radial plane with said blower to remove particulates and moisture from said gas, draining moisture from the device through said drain as said gas moves to said outlet.

18. A device as claimed in any one of claim 1, 2 or 3 wherein said moisturizer is at least one spray nozzle that is constructed to add a fine mist to said gas.

19. A device as claimed in any one of claim 3 or 4 wherein said first set of blades are vanes.

20. A device as claimed in claim 1 wherein there is a plate located beneath said Wades of said rotor.

21. An emission control device comprising an inlet and an outlet for gas containing particulates, said device having a housing wit a passage extending between said inlet and said outlet, a moisturizer located at or near said inlet to moisturize said gas, a blower located to cause said gas to flow through said device, a rotor located in said housing across said passage, said rotor being rotatably mounted to remove moisture and particulates from said gas, said blower and said rotor being constructed on the same component with two sets of blades at least partially within a common plane parallel to said component, said passage having a change in direction to assist in removing moisture and particulates from said gas, said device having a drain for moisture.

22. A device as claimed in claim 21 wherein said two sets of blades are a first set of blades for said blower and a second set of blades for said rotor.

23. A device as claimed in claim 21 wherein said first set of blades is oriented at an angle to force said gas through said device and said second set of blades is oriented at an angle that is substantially perpendicular to a direction of rotation of said component.

* * * * *